(12) United States Patent
Ariyama et al.

(10) Patent No.: US 11,156,476 B2
(45) Date of Patent: Oct. 26, 2021

(54) ABNORMALITY DETERMINATION DEVICE, ABNORMALITY DETERMINATION METHOD, AND NON-TRANSITORY RECORDING MEDIUM

(71) Applicant: NEC Corporation, Tokyo (JP)

(72) Inventors: Tetsuri Ariyama, Tokyo (JP); Tan Azuma, Tokyo (JP); Soichiro Araki, Tokyo (JP); Kenichiro Fujiyama, Tokyo (JP); Mineto Satoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 103 days.

(21) Appl. No.: 16/479,256

(22) PCT Filed: Feb. 5, 2018

(86) PCT No.: PCT/JP2018/003767
§ 371 (c)(1),
(2) Date: Jul. 19, 2019

(87) PCT Pub. No.: WO2018/147215
PCT Pub. Date: Aug. 16, 2018

(65) Prior Publication Data
US 2019/0383641 A1 Dec. 19, 2019

(30) Foreign Application Priority Data
Feb. 7, 2017 (JP) .............................. JP2017-020480

(51) Int. Cl.
*G01D 1/16* (2006.01)
(52) U.S. Cl.
CPC .................................... *G01D 1/16* (2013.01)

(58) Field of Classification Search
CPC ...... G01D 1/16; G01D 21/00; G05B 23/0221; G05B 23/0237
See application file for complete search history.

(56) References Cited

U.S. PATENT DOCUMENTS

2005/0157327 A1* 7/2005 Shoji .................... G06K 15/408
358/1.14
2005/0197806 A1* 9/2005 Eryurek ............. G05B 23/0221
702/188
(Continued)

FOREIGN PATENT DOCUMENTS

JP S59-154320 A 9/1984
JP S59-196418 A 11/1984
(Continued)

OTHER PUBLICATIONS

Extended European Search Report for EP Application No. EP18750969.0 dated Jan. 27, 2020.
(Continued)

*Primary Examiner* — Mischita L Henson
(74) *Attorney, Agent, or Firm* — Sughrue Mion, PLLC

(57) ABSTRACT

Provided are an abnormality determination device and the like that are able to accurately determine abnormalities regarding an inspection subject. The abnormality determination device is configured to calculate a scatter degree of differences between prediction information on an observation target and observation information on the observation target, the prediction information being an information generated in accordance with a scenario that represents an aspect of state change of the observation target, the observation information generated by an inspection target; and determine whether or not the inspection target is abnormal based on the calculated degree.

11 Claims, 6 Drawing Sheets

(56) References Cited

U.S. PATENT DOCUMENTS

| | | | |
|---|---|---|---|
| 2011/0276828 A1 | 11/2011 | Tamaki et al. | |
| 2012/0136629 A1 | 5/2012 | Tamaki et al. | |
| 2013/0173218 A1* | 7/2013 | Maeda ............... | G05B 23/0221 |
| | | | 702/182 |
| 2014/0286372 A1 | 9/2014 | Kobayashi et al. | |
| 2016/0239366 A1 | 8/2016 | Yabuki | |
| 2017/0003667 A1 | 1/2017 | Nakabayashi et al. | |

FOREIGN PATENT DOCUMENTS

| | | |
|---|---|---|
| JP | S61-145415 A | 7/1986 |
| JP | H03-138528 A | 6/1991 |
| JP | 2003-270193 A | 9/2003 |
| JP | 2014-182694 A | 9/2014 |

OTHER PUBLICATIONS

International Search Report for PCT Application No. PCT/JP2018/003767, dated Apr. 3, 2018.
English translation of Written opinion for PCT Application No. PCT/JP2018/003767.

* cited by examiner

ABNORMALITY DETERMINATION DEVICE, ABNORMALITY DETERMINATION METHOD, AND NON-TRANSITORY RECORDING MEDIUM

This application is a National Stage Entry of PCT/JP2018/003767 filed on Feb. 5, 2018, which claims priority from Japanese Patent Application 2017-020480 filed on Feb. 7, 2017, the contents of all of which are incorporated herein by reference, in their entirety.

TECHNICAL FIELD

The present invention relates to an abnormality determination device and the like that determines an abnormality of an inspection target.

BACKGROUND ART

A process of inspecting an observation device usually includes visiting site of the observation device actually, conducting a test corresponding to the observation device, and determining whether or not the observation device is abnormal based on a result of the test. Hereinafter, a device subjected to an inspection (for example, the observation device) is referred to as an "inspection target". However, in the case of inspecting an inspection target in the above-mentioned manner, as the number of the inspection targets is larger or sites where the inspection targets are installed are scattered more widely, the inspection requires more labor and further requires longer time.

For example, PTLs 1 and 2 discloses a device for detecting abnormality of an inspection target.

The device disclosed in PTL 1 predicts a state of a plant in accordance with dynamic model information indicating a state of the plant, and detects abnormality of an observation device that observes the plant, based on a likelihood ratio regarding differences between the predicted state and information generated by the observation device (i.e., residual signals).

The device disclosed in PTL 2 executes a thermal fluid simulation for a temperature in accordance with physical model information indicating temperature change caused by an air-conditioning device installed in a data center, and detects abnormality of an observation device that observes the data center, based on differences between a simulation result and information generated by the observation device.

CITATION LIST

Patent Literature

PTL 1: Japanese Unexamined Patent Application Publication No. 1984 (S59)-154320
PTL 2: Japanese Unexamined Patent Application Publication No. 2014-182694

SUMMARY OF INVENTION

Technical Problem

An inspection target is sometimes under an unstable state and is, then, shifted to a fault state. The unstable state is a state such as occasionally generating observation information indicating values far from true values. However, the device disclosed in PTL 1 or 2 cannot necessarily detect the unstable state caused to the inspection target. This is because the device does not necessarily determine that the unstable state caused to the inspection target as abnormality of the inspection target.

Thus, one object of the present invention is to provide an abnormality determination device and the like capable of determining abnormality of an inspection target accurately.

Solution to Problem

As an aspect of the present invention, an abnormality determination device includes:

calculation means for calculating a scatter degree of differences between prediction information on an observation target and observation information on the observation target, the prediction information being an information generated in accordance with a scenario that represents an aspect of state change of the observation target, the observation information generated by an inspection target; and determination means for determining whether or not the inspection target is abnormal based on the degree calculated by the calculation means.

In addition, as another aspect of the present invention, an abnormality determination method includes:

calculating a scatter degree of differences between prediction information on an observation target and observation information on the observation target, the prediction information being an information generated in accordance with a scenario that represents an aspect of state change of the observation target, the observation information generated by an inspection target; and determining whether or not the inspection target is abnormal based on the calculated degree.

In addition, as another aspect of the present invention, an abnormality determination program makes a computer achieve:

a calculation function for calculating a scatter degree of differences between prediction information on an observation target and observation information on the observation target, the prediction information being an information generated in accordance with a scenario that represents an aspect of state change of the observation target, the observation information generated by an inspection target; and a determination function for determining whether or not the inspection target is abnormal based on the degree calculated by the calculation function.

Furthermore, the object is also achieved by a computer-readable recording medium that records the program.

Advantageous Effects of Invention

The abnormality determination device and the like according to the present invention are capable of determining abnormality of the inspection target accurately.

EXAMPLE EMBODIMENT

Next, with reference to the drawings, detailed description will be made on example embodiments for carrying out the present invention.

First Example Embodiment

Figure 1:
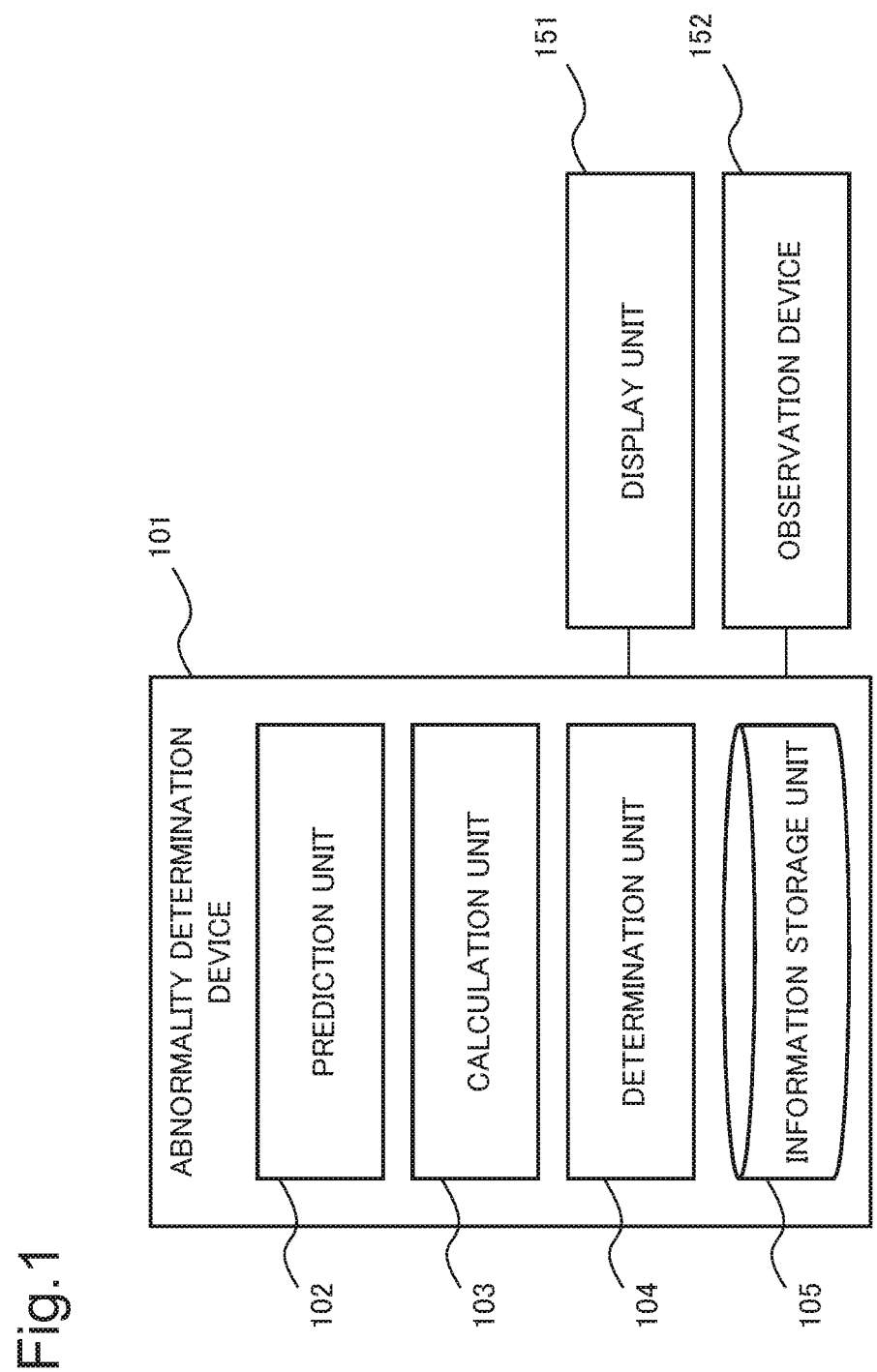
FIG. 1 is a block diagram illustrating a configuration of an abnormality determination device according to a first example embodiment of the present invention.

With reference to FIG. 1, detailed description will be made on a configuration of an abnormality determination device 101 according to a first example embodiment of the present invention. FIG. 1 is a block diagram illustrating a configuration of the abnormality determination device 101 according to the first example embodiment of the present invention.

The abnormality determination device 101 according to the first example embodiment includes a prediction unit (predictor) 102, a calculation unit (calculator) 103, a determination unit (determiner) 104, and an information storage unit 105.

An observation device 152 observes a physical state of an observation target such as temperature, generates observation information indicating an amount representing the observed physical state, and stores the generated observation information in the information storage unit 105. In other words, the observation information indicates information obtained by observing an observation target. The observation device 152 may output the generated observation information to an information processing device such as a personal computer. The observation device 152 executes an observation suitable for an observation target. When an observation target is motion of a moving body such as an automobile, the observation device 152 can be achieved by using an acceleration sensor, a gyro sensor, an imaging device, a thermometer for measuring a temperature inside a vehicle, and the like. The observation device 152 is not limited to the above-mentioned examples.

The information storage unit 105 may store information different from the observation information. For example, the information storage unit 105 may store public data regarding weather such as temperature and humidity. The information stored in the information storage unit 105 is not limited to the above-mentioned examples.

In the following description, it is assumed that the observation information generated regarding the observation target is stored in the information storage unit 105.

Figure 2:
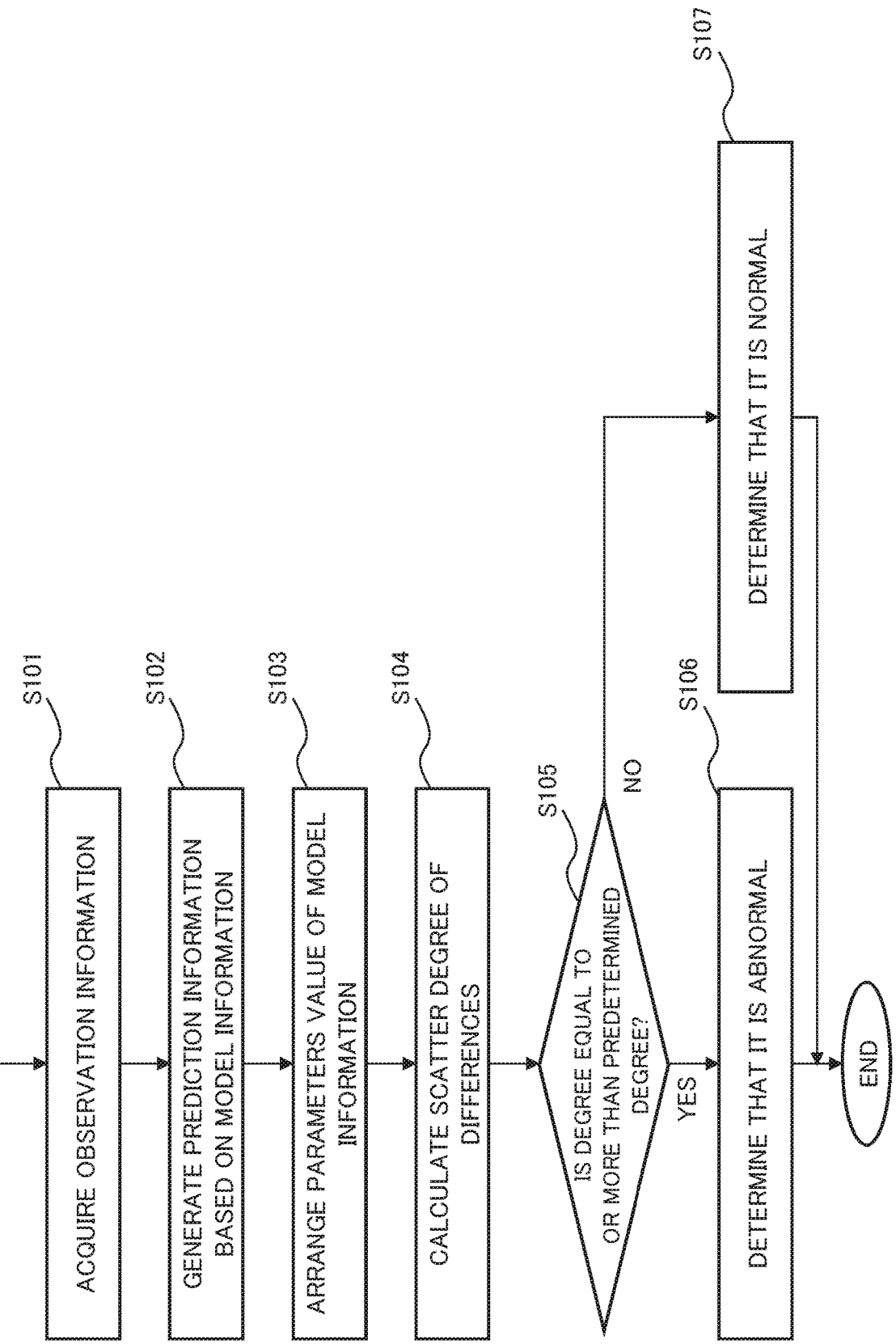
FIG. 2 is a flowchart illustrating a flow of processing of the abnormality determination device according to the first example embodiment.

Next, with reference to FIG. 2, a detailed description will be made on processing of the abnormality determination device 101 according to the first example embodiment of the present invention. FIG. 2 is a flowchart illustrating a flow of the processing of the abnormality determination device 101 according to the first example embodiment. In FIG. 2, the abnormality determination device 101 determines whether or not the observation device is abnormal. The observation device is an inspection target.

The prediction unit 102 acquires observation information stored in the information storage unit 105 (Step S101). The prediction unit 102 predicts a state of an observation target based on model information on the observation target, and generates prediction information indicating the predicted result (Step S102). The model information is, for example, information indicating a state of an observation target as exemplified in Eqn. 1 (described later) or Eqn. 2 (described later).

The prediction unit 102 may further generate a scenario that represents an aspect of a predicted state changing with the elapse of time. In such a case, a state included in the scenario represents the predicted state of the observation target. The state represents information predicted on observation information, which is generated by an observation device (inspection target) that observes the observation target, for example. In other words, the prediction unit 102 predicts a scenario that represents an aspect of state change of the observation target.

The model information may be an equation of motion that represents a physical phenomenon such as motion of a free-falling object, for example. The model information may only be model information in which the state of the observation target is described mathematically, and is not limited to the above-mentioned example. The model information may be, for example, state space model information as described later with reference to Eqn. 1 and Eqn. 2.

The calculation unit 103 arranges parameter values of the model information based on the prediction information generated by the prediction unit 102 and the observation information stored in the information storage unit 105 so as to match the model information with the observation information. The model information is a basis of generating the prediction information. In other words, the calculation unit 103 arranges the values of the parameters including a parameter indicating the state in the model information based on the prediction information and the observation information, (Step S103). In Step S103, the calculation unit 103 calculates noise between the observation information and the prediction information (observation noise), and adjusts the values of the parameters based on the calculated noise. The processing in Step S103 may be, for example, processing called "data assimilation" described later. Further, the processing in Step S103 may be executed by the prediction unit 102.

The calculation unit 103 calculates a scatter degree (extent) of differences between the observation information and the prediction information over the above-mentioned scenarios (Step S104). For example, when the differences between the observation information and the prediction information are 3 for a first scenario, 4 for a second scenario, and 5 for a third scenario, the scatter degree of those differences over the first to third scenarios is a scatter of 3, 4, and 5 (about 0.666). Therefore, when the prediction information is accurate, a larger value of the degree indicates more unstable state of the inspection target generating the observation information. Further, a smaller value of the degree indicates less unstable state of the inspection target generating the observation information. The scatter degree of the differences may be a degree as described later with reference to Eqn. 1 to Eqn. 3.

Further, a plurality of scenarios may be used similarly in a technology of a particle filter and the like. In the case of the plurality of scenarios, the calculation unit 103 calculates a scatter degree over the plurality of scenarios similarly to the above-mentioned processing. Alternatively, one scenario may be used similarly in a technology of a Kalman filter and the like. In this case, the calculation unit 103 calculates a scatter degree based on a predetermined distribution of the scenario.

The determination unit 104 compares magnitude of the degree calculated by the calculation unit 103 and a predetermined degree (Step S105). When the degree is equal to or more than the predetermined degree (YES in Step S105), the determination unit 104 determines that the inspection target generating the observation information (in this case, the observation device 152) is abnormal (Step S106). When the degree is less than the predetermined degree (NO in Step S105), the determination unit 104 determines that the inspection target generating the observation information (in this case, the observation device 152) is normal (Step S107).

The determination unit 104 displays information indicating whether or not the observation device 152 is abnormal on a display unit 151.

Next, as one example of the processing in Step S103 and the like, detailed description will be made on data assimilation. The data assimilation is a technology of merging a mathematical model and an observation value. The processing executed in the data assimilation can be described by system model information exemplified in Eqn. 1, and state space model information indicated by observation model information exemplified in Eqn. 2.

$$x_t = f_t(x_{t-1}) + v_t \qquad \text{(Eqn. 1)},$$

$$y_t = h_t(x_t) + w_t \qquad \text{(Eqn. 2)},$$

Note that, $x_t$ denotes a state vector (state array) containing a plurality of symbols (or numerical values, signs) indicating a state of the observation target at a timing t. $f_t$ denotes system model information indicating a relevance between a state vector at a timing (t−1) and a state vector at the timing t. $f_t$ denotes, for example, processing for obtaining a state in an order of the timing in a case of discretizing simultaneous linear equations indicating time development by an explicit method, or processing for obtaining a state by solving the simultaneous linear equations in a case of discretizing the simultaneous linear equations by an implicit method. $v_t$ denotes system noise regarding the system model information at the timing t. $y_t$ denotes observation information (for example, an observation value) at the timing t. $h_t$ denotes observation model information indicating a relevance between the state vector at the timing t and the observation information at the timing t. $w_t$ denotes observation noise regarding the observation model information at the timing t. $x_t$ may denote a state of observation information each generated by a plurality of observation devices. $f_t$ and $h_t$ include a plurality of parameters such as a parameter $\theta$ (described later with reference to Eqn. 4) regarding the observation noise $w_t$.

Hereinafter, for convenience of the description, it is assumed that each of the vectors ($h_t(x_t)$ and the like) and the observation noise $w_t$ include only one value. However, each of the vectors and the observation noise may include a plurality of values. In the case where each of the vectors and the observation noise include a plurality of values, processing as described later is executed for each of the values.

The observation noise $w_t$ denotes, for example, noise regarding the observation information generated by the observation device 152. As the observation noise $w_t$ is farther away from 0, the observation information generated by the observation device 152 contains larger noise. Specifically, as the value of the observation noise $w_t$ is away from 0, a difference between the observation information and the prediction information is larger. In contrast, as the value of the observation noise $w_t$ is closer to 0, the difference between the observation information and the prediction information is smaller.

For convenience of the description, it is assumed that the observation noise $w_t$ is generated in accordance with a normal distribution with mean 0 and scatter $\gamma^2$ (note that $\gamma \geq 0$) in the scenario as shown in Eqn. 3

$$Wt \sim N(0, \gamma^2) \qquad \text{(Eqn. 3)},$$

Note that, $N(0, \gamma^2)$ represents a normal distribution with mean 0 and scatter $\gamma^2$. An operator "~" denotes that a value of a parameter on the left side of the operator follows a distribution shown on the right side of the operator.

In this case, as the scatter $\gamma^2$ regarding the observation noise $w_t$ is larger, the observation device 152 is in an unstable state. Further, as the scatter $\gamma^2$ regarding the observation noise $w_t$ is closer to 0, the observation device 152 is in a stable state.

The observation noise $w_t$ in data assimilation is one example of the differences described with reference to FIG. 2. Further, the scatter is one example of the scatter degree (scatter extent) as described with reference to FIG. 2.

For example, the observation noise $w_t$ can be calculated through use of an evaluation value calculated based on the prediction information and the observation information. The evaluation value is calculated in accordance with a likelihood $E(\theta)$ exemplified in Eqn. 4, for example.

$$E(\theta) = \Pi^T_{\{t=1\}} p(y_t | x_{(t|t-1)}, \theta) \qquad \text{(Eqn. 4)},$$

Note that, $\theta$ denotes a parameter regarding the observation noise $w_t$. $\Pi^T_{\{t=1\}}$ denotes an arithmetic operation for calculating a product of t satisfying $1 \leq t \leq T$. p denotes a probability density function. $x_{(t|t-1)}$ denotes a state vector that is calculated by applying the processing in Eqn. 1 to a state vector $x_{t-1}$ and denotes the state vector at the timing t. $p(y_t | x_{(t|t-1)}, \theta)$ denotes a probability that the observation information (observation vector $y_t$) is generated in a case where the observation noise described by the state vector $x_{(t|t-1)}$ and the parameter $\theta$ is generated.

In a case where the probability density function p is close to 1, when the prediction information (state vector $x_t$) is generated, a probability that the observation information (observation vector $y_t$) is observed is high. Specifically, in this case, the prediction information and the observation information are highly relevant to each other. In a case where the probability density function p is close to 0, even when the prediction information (state vector $x_t$) is generated, a probability that the observation information (observation vector $y_t$) is observed is low. Specifically, in this case, the prediction information and the observation information are not highly relevant to each other.

Thus, in the example shown in Eqn. 4, $E(\theta)$ denotes a relevance between the observation information, and the prediction information and the observation noise for a period from a timing 1 to the timing t. In other words, when the prediction information and the observation noise (i.e., differences between the observation information and the prediction information) are generated, $E(\theta)$ represents a degree to which the observation information is likely to be generated. The observation noise $w_t$ is set in such a way as to have a high relevance. For example, the observation noise $w_t$ can be calculated as a value of the parameter $\theta$ in a case where $E(\theta)$ is maximum. In other words, in the data assimilation, such a value of the parameter $\theta$ that the prediction accuracy is high is set as the observation noise $w_t$. In other words, in the data assimilation, a value of the parameter θ in a case where the prediction information and the observation information are plausible is set as the observation noise $w_r$. In other words, the calculation unit 103 calculates a value of the parameter θ in a case where the observation information is more likely to be generated (i.e., E(θ) is a large value) as the observation noise (differences). The calculation unit 103 (or the prediction unit 102) may execute processing regarding the data assimilation as described above in Steps S102 and S103.

For example, the determination unit 104 may determine whether or not the observation device 152 generating the observation information being the base of the differences is abnormal, based on the calculated degree at the timing t (i.e., the scatter degree of the differences) and the magnitude of the calculated degree at the timing (t−1). In this case, for example, the determination unit 104 may determine that the observation device 152 is abnormal in a case where a ratio of the calculated degree at the timing t with respect to the calculated degree at the timing (t−1) is equal to or more than a predetermined threshold value (for example, (threshold value)>1). For example, the determination unit 104 may determine whether or not the observation device 152 is abnormal, based on the difference between the calculated degree at the timing (t−1) and the calculated degree at the timing t. The predetermined threshold value may be determined by following a statistical method, based on previously calculated degree and actual abnormality of the observation device 152.

The determination unit 104 may determine whether or not the observation device 152 generating the observation information being the base of the differences is abnormal, based on degrees calculated at timings away from each other by two or more timings.

To summarize the above-mentioned processing, the calculation unit 103 calculates the observation noise (i.e., differences) at a first timing and a second timing that is later than the first timing. The determination unit 104 determines that the observation device (i.e., the inspection target) generating the observation information being the base of the differences is abnormal, in a case where a value of the calculated difference at the second timing is larger than that of the calculated difference at the first timing by the predetermined threshold value (note that, a positive value) or more.

Further, the determination unit 104 may calculate the degree during a certain period by summing (or integrating) the degrees at timings included during the certain period. In this case, the determination unit 104 determines whether or not the observation device 152 generating the observation information being the base of the differences is abnormal, based on the magnitude of the degrees during two periods.

Further, the degree may be calculated based on the prediction information during the certain period and the observation information during the certain period. In this case, the prediction unit 102 sums (or integrates) the generated prediction information at the respective timings included during the certain period, and further sums (or integrates) the observation information generated at the respective timings. The prediction unit 102 calculates the observation noise (i.e., differences) based on the calculated prediction information, the calculated observation information, and E(θ) exemplified in Eqn. 4.

The determination unit 104 may determine whether or not the observation device 152 generating the observation information being the base of the differences is abnormal based on a derivative value of two degrees.

In a case of processing for comparing the degrees at the two timings or during the two periods, an effect that the predetermined degree is not required to be set for determination processing shown in Step S105 in FIG. 2 is exerted.

It is only required that the information indicating the result determined by the determination unit 104 have a mode in which a user can be informed with the result, and the mode may be different from the mode of displaying the result on the display unit 151. The determination unit 104 may output the information indicating the result to the user through use of, for example, a speaker or a light emission diode (LED). In a case where the determination unit 104 outputs the information indicating the result through use of an LED, a color corresponding to a content of the information or a blink pattern corresponding to a content of the information may be output. The mode of outputting the information is not limited to the above-mentioned examples.

Next, description will be made on an advantageous effect of the abnormality determination device 101 according to the first example embodiment of the present invention.

The abnormality determination device 101 according to the first example embodiment can accurately determine abnormality of the inspection target. This is because the abnormality determination device 101 determines an unstable state, which is caused as a signal symptom before an unfunctional state of the observation device 152, based on the scatter degree, for example. When the abnormality determination device 101 determines that the observation device 152 is abnormal, a user can promptly deal with the abnormality by taking a measure of, for example, replacing or fixing components that the observation device 152 includes.

The abnormality determination device 101 may communicate the observation information, the prediction information, the determination result, and the like through a communication network. For example, the communication network includes a wired local area network (LAN), a wireless LAN, radio communication, and the like. In this case, the abnormality determination device 101 can reduce cost such as labor cost and time required for inspecting the observation device 152.

Further, when the processing is executed by following the data assimilation, the calculation unit 103 (or the prediction unit 102) may execute processing using a successive Bayesian filter, a Kalman filter, a particle filter, and the like, or processing using a sequential Monte Carlo method, and a Monte Carlo filter. The processing is not limited to the above-mentioned examples.

Second Example Embodiment

Next, description will be made on a second example embodiment of the present invention, which is based on the first example embodiment described above.

In the following description, description will be mainly made on characteristic parts according to this example embodiment. The configurations similar to those in the first example embodiment described above will be denoted by the same reference numbers, and description therefor will be omitted.

Figure 3:
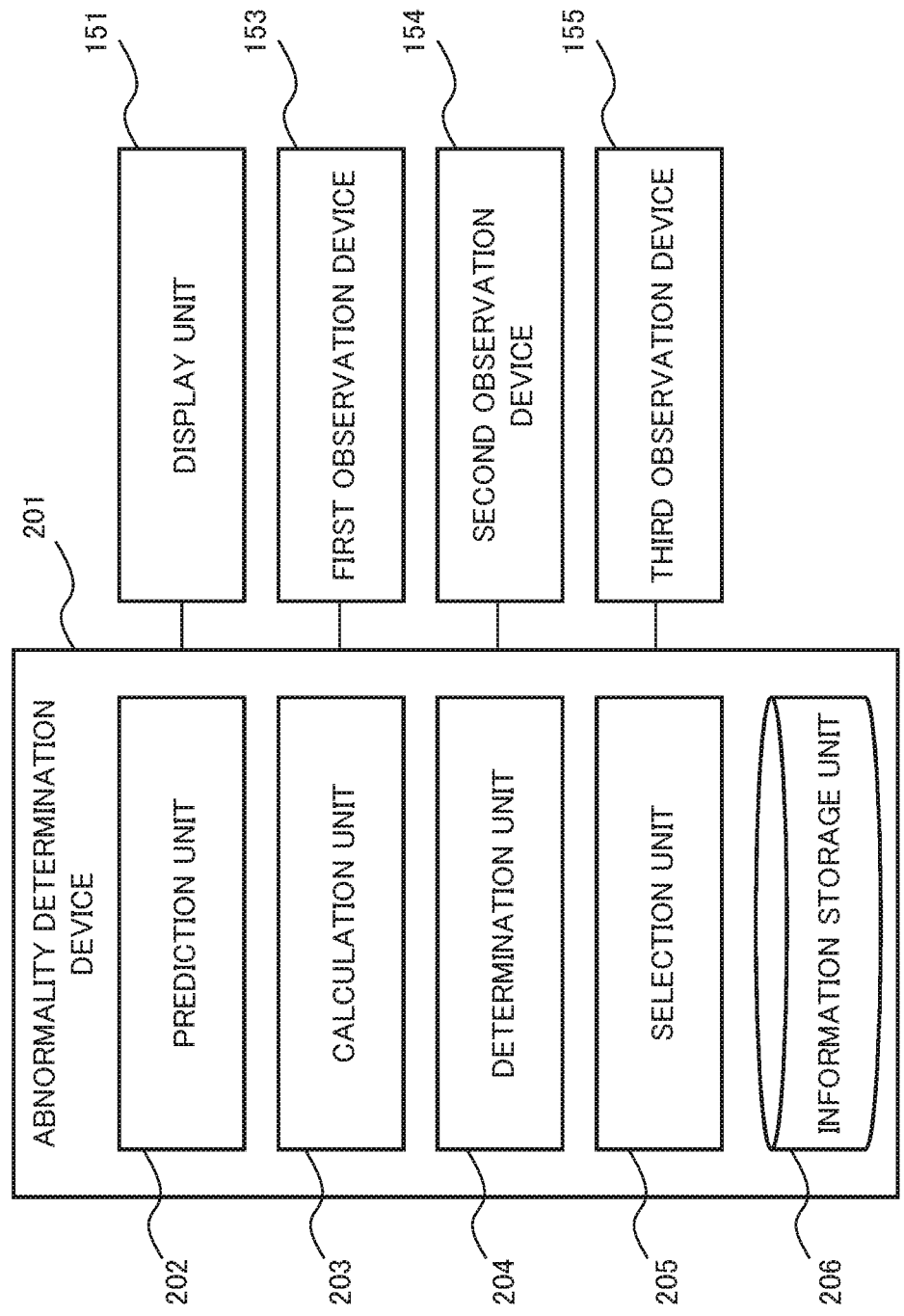
FIG. 3 is a block diagram illustrating a configuration of an abnormality determination device according to a second example embodiment of the present invention.

With reference to FIG. 3, detailed description will be made on a configuration of an abnormality determination device 201 according to the second example embodiment of the present invention. FIG. 3 is a block diagram illustrating a configuration of the abnormality determination device 201 according to the second example embodiment of the present invention.

The abnormality determination device 201 according to the second example embodiment includes a prediction unit (predictor) 202, a calculation unit (calculator) 203, a determination unit (determiner) 204, a selection unit (selector) 205, and an information storage unit 206.

The abnormality determination device 201 is connected to a first observation device 153, a second observation device 154, and a third observation device 155, or is connected in a communicable manner. The first observation device 153, the second observation device 154, and the third observation device 155 may be observation devices of the same kind, or may be observation devices of different kinds. Further, for convenience of the description, it is assumed that the number of observation devices is three, but the number is only required to be plural.

The prediction unit 202 has a function similar to that of the prediction unit 102 in FIG. 1. The information storage unit 206 can store information similar to that in the information storage unit 105 in FIG. 1.

Figure 4:
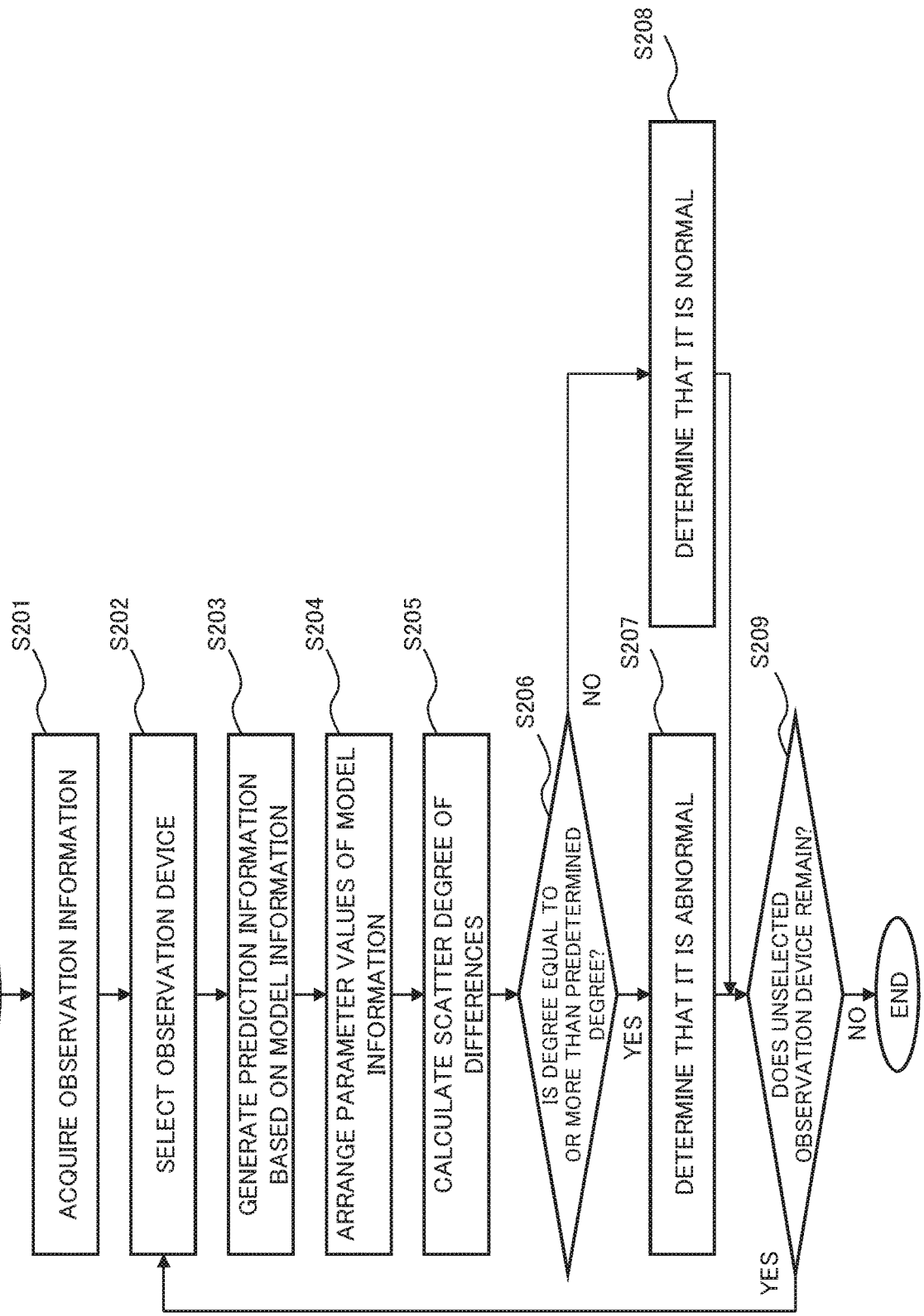
FIG. 4 is a flowchart for illustrating a flow of processing of the abnormality determination device according to the second example embodiment.

Next, with reference to FIG. 4, detailed description will be made on processing of the abnormality determination device 201 according to the second example embodiment of the present invention. FIG. 4 is a flowchart for illustrating a flow of the processing of the abnormality determination device 201 according to the second example embodiment.

The prediction unit 202 acquires observation information stored in the information storage unit 206 (Step S201). The prediction unit 202 reads the observation information each generated by the first observation device 153, the second observation device 154, and the third observation device 155. The processing in Step S201 is the same as the processing in Step S101 in FIG. 2.

The selection unit 205 selects a part of the first observation device 153, the second observation device 154, and the third observation device 155 as the inspection target (Step S202). The selection unit 205 selects one observation device as the inspection target, for example.

For convenience of the description, it is assumed that the selection unit 205 selects the first observation device 153 as the inspection target. Further, the observation devices that the selection unit 205 does not select as the inspection target (in this example, the second observation device 154 and the third observation device 155) are referred to as "reference devices". Further, the observation information generated by the reference devices is referred to as "reference observation information".

The prediction unit 202 predicts change of the observation target along transition of time, based on model information on the observation target and the reference observation information, and generates prediction information indicating the predicted result (Step S203). Specific description will be made on Step S203.

For convenience of the description, it is assumed that each of the first observation device 153, the second observation device 154, and the third observation device 155 observes acceleration of one moving body being an observation target, and generates observation information indicating the observed acceleration. It is assumed that the first observation device 153 is installed in a center of the moving body. It is assumed that the second observation device 154 is installed at one end of the moving body. It is assumed that the third observation device 155 is installed at another end of the moving body. Further, it is assumed that a predetermined relevance is established between the observation information generated by the inspection target and the reference observation information. For convenience of the description, it is assumed that the predetermined relevance is a relevance exemplified in Eqn. 5.

$$a1p=(a2+a3)\div 2 \quad \text{(Eqn. 5)},$$

Note that a1p denotes estimation information on the observation information generated by the first observation device 153. a2 denotes the observation information generated by the second observation device 154. a3 denotes the observation information generated by the third observation device 155.

The relevance may be the predetermined relevance, or may be a relevance estimated based on the observation information. The relevance is not limited to the above-mentioned example. Specifically, the relevance may be a relevance different from the relevance exemplified in Eqn. 5.

In Step S203, the calculation unit 203 calculates estimation information (for example, a1p in Eqn. 5) about the first observation device 153 in accordance with the predetermined relevance as exemplified in Eqn. 5. The calculation unit 203 predicts a state of the observation target by executing the processing, which is described with reference to Eqns. 1 and 2, to the calculated estimation information and the reference observation information, and generates the prediction information indicating the predicted result. In this case, the processing in Step S203 is the same as the processing in Step S102 in FIG. 2.

Further, the processing in Step S203 can be achieved even with processing obtained by reflecting the predetermined relevance exemplified in Eqn. 5 to the processing described with reference to Eqns. 1 and 2. Description will be made on this processing with reference to Eqns. 6 and 7.

$$\text{observation model; } y_t = H_t \times x_t + w_t \quad \text{(Eqn. 6)},$$

Note that $H_t$ denotes a matrix generated based on the relevance exemplified in Eqn. 5, and is a matrix exemplified in Eqn. 7, for example. Here, for description, Eqn. 2 is described as Eqn. 6.

$$H_t = \begin{bmatrix} 0 & \frac{1}{2} & \frac{1}{2} \\ 0 & 1 & 0 \\ 0 & 0 & 1 \end{bmatrix}, \quad x_t = \begin{bmatrix} a1 \\ a2 \\ a3 \end{bmatrix} \quad \text{(Eqn. 7)}$$

Note that a1 denotes the observation information generated by the first observation device 153.

In this case, in the processing in Step S203, the calculation unit 203 (or the prediction unit 202) generates the prediction information based on the observation model information including the relevance (exemplified in Eqn. 5) between the reference observation information and the observation information. In the processing in accordance with Eqns. 6 and 7, the observation information generated by the inspection target (in this example, the first observation device 153) does not influence the prediction information. Specifically, the calculation unit 203 (or the prediction unit 202) generates the prediction information on the inspection target and the prediction information on the reference devices, based on the reference observation information.

The calculation unit 203 arranges values of parameters in the model information (exemplified in Eqns. 1 and 2) based on the prediction information and the observation information (Step S204). The processing in Step S204 is the same as the processing in Step S103 in FIG. 2.

The calculation unit 203 calculates a scatter degree of differences between the observation information on the inspection target and the prediction information on the inspection target over scenarios (Step S205). The processing in Step S205 is the same as the processing in Step S104 in FIG. 2.

Hereinafter, the processing in Steps S206 to S208 is executed. The processing in Steps S206 to S208 is the same as the processing in Steps S105 to S107 in FIG. 2.

Simple description will be made on the processing in Steps S203 to S208. The calculation unit 203 generates the prediction information on the inspection target based on the reference observation information generated by the reference devices. The calculation unit 203 calculates a scatter degree of differences between the prediction information on the inspection target and the observation information generated by the inspection target over the scenarios. The determination unit 204 determines whether or not the inspection target is abnormal, based on the degree calculated by the calculation unit 203.

Subsequently, the selection unit 205 determines whether or not an observation device that is not selected as an inspection target is present among the observation devices (Step S209). When the observation device that is not selected as an inspection target is present (YES in Step S209), the selection unit 205 selects the observation device being the inspection target from the observation devices (Step S202). When the observation device that is not selected as an inspection target is absent (NO in Step S209), the abnormality determination device 201 terminates the processing. Specifically, the abnormality determination device 201 selects a different inspection target, and determines whether or not the selected inspection target is abnormal.

When abnormality is determined in Step S207, the abnormality determination device 201 may terminate the processing in Steps S202 to S209.

In other words, with the about-mentioned processing, the calculation unit 203 calculates observation noise (i.e., differences) of a second inspection target different from a first inspection target, based on first observation information generated by the first inspection target. The determination unit 204 calculates whether or not the second inspection target is abnormal based on the degree in accordance with the processing in Steps S206 to S208.

The inspection target to be determined whether or not it is abnormal is not necessarily one observation device, but may be plural observation devices. Further, the abnormality determination device 201 may execute the processing for determining abnormality of the first observation device 153 based on the observation information observed by the first observation device 153 and the processing for determining abnormality of the first observation device 153 based on the observation information observed by the second observation device 154 and the observation information observed by the third observation device 155. In this case, when abnormality is determined in any of the processing, for example, the abnormality determination device 201 may determine that the first observation device 153 is abnormal. Alternatively, when abnormality is determined in all the processing, for example, the abnormality determination device 201 may determine that the first observation device 153 is abnormal. Further, the number of observation devices may be two, four, or more. Specifically, when the number of observation devices being the inspection targets is three or more, the calculation unit 203 calculates a degree of an inspection target of interest, based on a plurality of pieces of the observation information including at least observation information generated by the observation devices different from the inspection target of interest.

The observation model information may not be the processing without referring the observation information on the inspection target as exemplified in Eqns. 5 to 7. For example, the abnormality determination device 201 may determine whether or not the inspection target is abnormal through use of the observation information observed by the respective observation devices including the inspection target. Specifically, the processing of the abnormality determination device 201 is not limited to the above-mentioned examples.

Further, in the above-mentioned example embodiments, it is assumed that the inspection target is an observation device, but the inspection target may be a general device.

Next, with reference to an example in which the abnormality determination device according to the above-mentioned example embodiments is applied to an observation device relating to information and communication technology (ICT) in agriculture, description will be made on processing of the abnormality determination device.

In ICT in agriculture, a large number of observation devices are sometimes set in a field where crops are cultivated. The observation devices include, for example, a device for observing a temperature, a device for observing humidity, a device for observing a wind direction or wind speed, a device for observing an amount of rainfall, a device for observing illuminance, a device for observing a temperature of soil of the field, a device for observing a moisture amount contained in the soil, an imaging device (camera) for the field, and the like. When the field has a large area, those devices are sometimes installed at positions away from each other by several tens kilometers. Therefore, in order to inspect those devices, a user may be required to go to sites where the devices are installed every time the inspection is conducted. Thus, the inspection of the devices requires a lot of time. Further, because inspection methods for the devices differ from each other depending on the devices, inspection of all the observation devices requires extremely heavy labor.

The abnormality determination device according to the above-mentioned example embodiments can reduce costs such as time and labor as described above. This is because, even when an inspection target is any of the observation devices, abnormality can be determined regardless of a type of the observation device by conducting the inspection using the abnormality determination device. Further, the abnormality determination device according to the example embodiments can determine abnormality of the observation device at an early stage. When the abnormality determination device determines that the inspection target is abnormal, abnormality of the inspection target is dealt with at an early stage. As a result, a time period in which the inspection target does not operate (fails) can be reduced.

Further, when the abnormality determination device 201 according to the second example embodiment is applied to ICT in agriculture, the abnormality determination device 201 determines abnormality of the observation devices based on the relevance between pieces of the observation information observed by the plurality of observation devices. The abnormality determination device 201 may correct the observation information generated by the observation device being the inspection target through use of the observation noise calculated based on the observation model information exemplified in Eqn. 6. With this, a service life of the observation device can be prolonged.

Not being limited to ICT in agriculture, the abnormality determination device according to the above-mentioned example embodiments may be used to determine abnormality of an aircraft including a device for observing acceleration, a gyro sensor, a device for observing an air pressure, a device for observing a temperature, and the like. The abnormality determination device according to the example embodiments may be used to determine abnormality of a power plant including a device for observing a temperature, a device for observing a flow rate, a device for observing the number of rotation of a turbine, a device for observing voltage, a device for observing electric current, and the like. A field of application of the abnormality determination device is not limited to the above-mentioned examples.

Next, description will be made on an advantageous effect of the abnormality determination device 201 according to the second example embodiment of the present invention.

The abnormality determination device 201 according to the second example embodiment can accurately determine abnormality of the inspection target. The reason for this is similar to the reason described in the first example embodiment.

Further, the abnormality determination device 201 according to the second example embodiment can further accurately determine abnormality of the inspection target. This is because influence of errors included in the observation information can be reduced mutually by calculating a scatter degree of differences based on a plurality of kinds of observation information.

Third Example Embodiment

Next, description will be made on a third example embodiment of the present invention.

Figure 5:
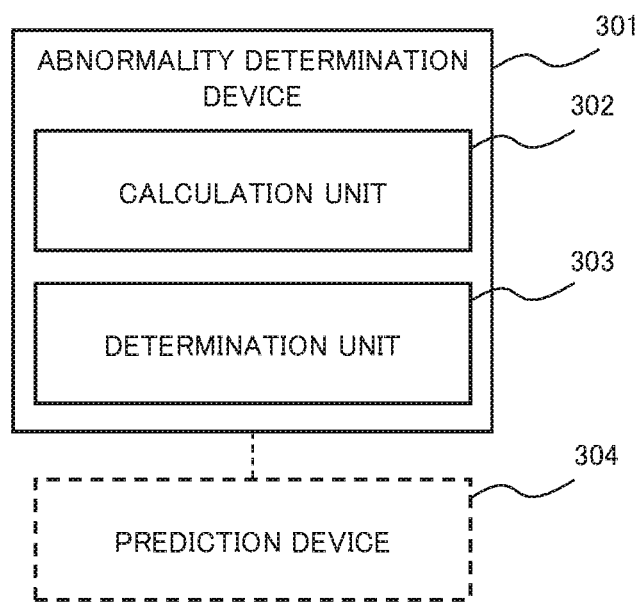
FIG. 5 is a block diagram illustrating a configuration of an abnormality determination device according to a third example embodiment of the present invention.

With reference to FIG. 5, detailed description will be made on a configuration of an abnormality determination device 301 according to the third example embodiment of the present invention. FIG. 5 is a block diagram illustrating a configuration of the abnormality determination device 301 according to the third example embodiment of the present invention.

The abnormality determination device 301 according to the third example embodiment includes a calculation unit (calculator) 302 and a determination unit (determiner) 303.

The abnormality determination device 301 is connected to a prediction device 304, which predicts a scenario representing an aspect of state change of an inspection target as described with reference to Eqns. 1 and 2, and the like, or is connected in a communicable manner. The prediction device 304 predicts a state (referred as a "prediction state") of the inspection target by executing the processing as described with reference to Eqns. 1 and 2, and the like, and generates prediction information indicating the prediction state. The abnormality determination device 301 inputs the prediction information predicted by the prediction device 304. The prediction information represents $h_t(x_t)$ calculated by following model information $h_t$ in Eqn. 2, for example.

Figure 6:
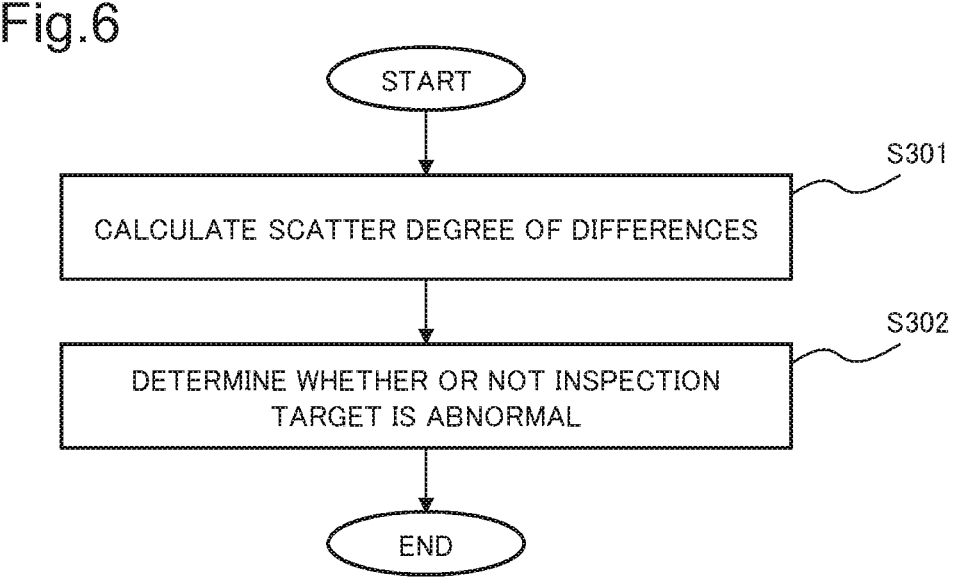
FIG. 6 is a flowchart illustrating a flow of processing of the abnormality determination device according to the third example embodiment.

Next, with reference to FIG. 6, detailed description will be made on the processing of the abnormality determination device 301 according to the third example embodiment of the present invention. FIG. 6 is a flowchart illustrating a flow of the processing of the abnormality determination device 301 according to the third example embodiment.

The abnormality determination device 301 inputs observation information on observation target. The observation information is observed by the inspection target. The observation information is, for example, information on the observation target, which is generated by the observation devices described above in the example embodiments (the observation device 152 in FIG. 1, the first observation device 153, the second observation device 154, and the third observation device 155 in FIG. 3, and the like). The observation information indicates the observation vector $y_t$ exemplified in Eqn. 2, for example.

The calculation unit 302 calculates a scatter degree of differences between the input observation information and the input prediction information over scenarios (Step S301). For example, the calculation unit 302 may calculate the degree by calculating numerical values representing the differences and calculating a scatter value of the calculated values. Alternately, for example, the calculation unit 302 may calculate the degree by calculating an average value of the differences and calculating a range of a predetermined number of the differences in an order closer to the calculated average value. For example, the predetermined number is obtained with a predetermined ratio (80%, 95%, or the like) with respect to the number of differences of the inspection target calculating the scatter degree. When the differences are distributed by following the predetermined relevance such as a normal distribution as exemplified in Eqn. 3, the calculation unit 302 may calculate a scatter degree of differences by determining the predetermined number of the differences in an order closer to 0 and obtaining a range of the determined differences. The processing that the calculation unit 302 calculates the degree is not limited to the above-mentioned examples.

The determination unit 303 determines whether or not the inspection target (not illustrated) generating the observation information is abnormal, based on the degree calculated by the calculation unit 302 (Step S302). When the calculated degree is equal to or more than a predetermined noise, for example, the determination unit 303 determines that the inspection target is abnormal. When the calculated degree is less than the predetermined noise, for example, the determination unit 303 determines that the inspection target is normal.

A function of the calculation unit 302 can be achieved by the function of the calculation unit 103 illustrated in FIG. 1 or the calculation unit 203 illustrated in FIG. 3. A function of the determination unit 303 can be achieved by the function of the determination unit 104 illustrated in FIG. 1 or the determination unit 204 illustrated in FIG. 3. Therefore, the abnormality determination device 301 can be achieved by the function of the abnormality determination device 101 illustrated in FIG. 1 or the abnormality determination device 201 illustrated in FIG. 3.

Next, description will be made on an advantageous effect of the abnormality determination device 301 according to the third example embodiment of the present invention.

The abnormality determination device 301 according to the third example embodiment can accurately determine abnormality of the inspection target. The reason for this is similar to the reason described in the first example embodiment.

(Hardware Configuration Example)

A configuration example of hardware resources that achieve an abnormality determination device according to each example embodiment of the present invention will be described. However, the abnormality determination device may be achieved using physically or functionally at least two calculation processing devices. Further, the program conversion device may be achieved as a dedicated device.

Figure 7:
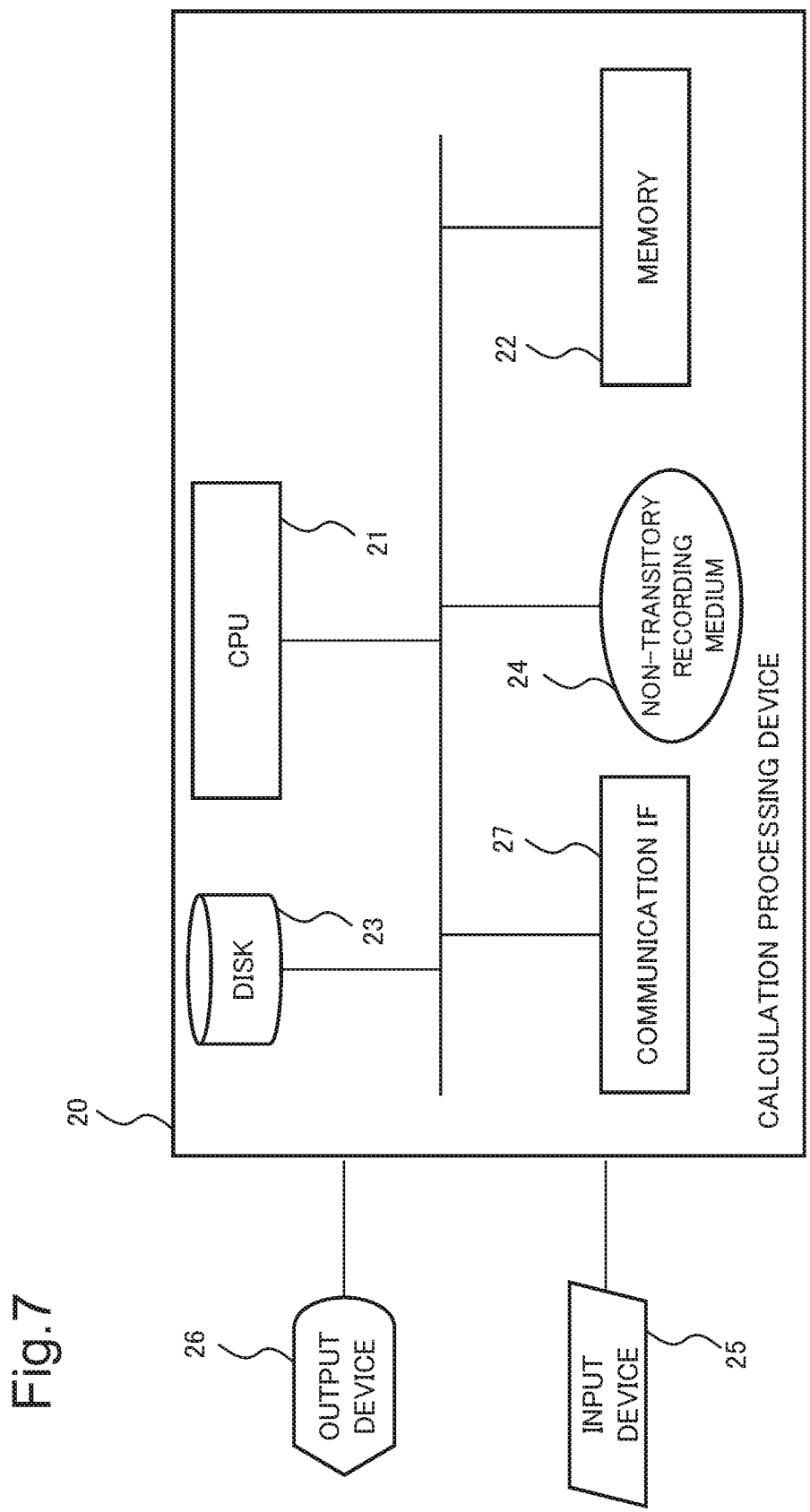
FIG. 7 is a block diagram schematically illustrating a hardware configuration of a calculation processing device capable of achieving an abnormality determination device according to each embodiment of the present invention.

FIG. 7 is a block diagram schematically illustrating a hardware configuration of a calculation processing device capable of achieving an abnormality determination device according to each embodiment of the present invention. A calculation processing device 20 includes a central processing unit (CPU) 21, a memory 22, a disk 23, a non-transitory recording medium 24, and a communication interface (hereinafter, referred to as. "communication I/F") 27. The calculation processing device 20 may connect an input device 25 and an output device 26. The calculation processing device 20 can execute transmission/reception of information to/from another calculation processing device and a communication device via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored in the disk 23 when executing the program and executes arithmetic processing. The CPU 21 reads data necessary for program execution from the memory 22. When display is needed, the CPU 21 displays an output result on the output device 26. When a program is input from the outside, the CPU 21 reads the program from the input device 25. The CPU 21 interprets and executes a program conversion program (FIG. 2, FIG. 4, or FIG. 6) present on the memory 22 corresponding to a function (processing) indicated by each unit illustrated in FIG. 1, FIG. 3, or FIG. 5 described above. The CPU 21 sequentially executes the processing described in each example embodiment of the present invention.

In other words, in such a case, it is conceivable that the present invention can also be made using the abnormality determination program. Further, it is conceivable that the present invention can also be made using a computer-readable, non-transitory recording medium storing the abnormality determination program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2017-020480, filed on Feb. 7, 2017, the disclosure of which is incorporated herein in its entirety.

REFERENCE SIGNS LIST 101 abnormality determination device
102 prediction unit
103 calculation unit
104 determination unit
105 information storage unit
151 display unit
152 observation device
201 abnormality determination device
202 prediction unit
203 calculation unit
204 determination unit
205 selection unit
206 information storage unit
301 abnormality determination device
302 calculation unit
303 determination unit
304 prediction device
153 first observation device
154 second observation device
155 third observation device
20 calculation processing device
21 CPU
22 memory
23 disk
24 non-transitory recording medium
25 input device
26 output device
27 communication IF

What is claimed is:

1. An abnormality determination device comprising:
a memory storing instructions; and
a processor connected to the memory and configured to executes the instructions to:
calculate a scatter degree of differences between prediction information on an observation target and observation information on the observation target, the prediction information being an information generated in accordance with a scenario that represents an aspect of state change of the observation target, the observation information generated by an inspection target; and
determine whether or not the inspection target is abnormal based on the calculated degree.

2. The abnormality determination device according to claim 1, wherein
the processor configured to generate the prediction information and
calculate the differences based on a probability density function and a difference between the prediction information and the observation information.

3. The abnormality determination device according to claim 2, wherein
the processor configured to generate the prediction information by generating prediction information during a period including a plurality of timings based on prediction information of a state of the observation target at the plurality of timings and generates the observation information by generating first observation information during the period, the observation information generated by the inspection target.

4. The abnormality determination device according to claim 3, wherein
the processor configured to calculate the degree at a first timing and the degree at a second timing after the first timing and
determine that the inspection target is abnormal when the calculated degree at the second timing is equal to or more than the degree at the first timing.

5. The abnormality determination device according to claim 1, wherein
the processor configured to determine that the inspection target is abnormal when the degree is equal to or more than a predetermined degree.

6. The abnormality determination device according to claim 1, wherein
the processor configured to calculate the degree for a second inspection target different from a first inspection target based on the observation information generated by the first inspection target, and determine whether or not the second inspection target is abnormal.

7. The abnormality determination device according to claim 6, wherein
the processor configured to calculate the degree for the second inspection target based on a plurality of observation information that include the observation information generated by an inspection target different from the second inspection target.

8. The abnormality determination device according to claim 1, wherein the aspect of state change of the observation target refers to a change between a normal state of the observation target and an abnormal state of the observation target.

9. An abnormality determination method by an information processing device, the method comprising:
calculating a scatter degree of differences between prediction information on an observation target and observation information on the observation target, the prediction information being an information generated in accordance with a scenario that represents an aspect of state change of the observation target, the observation information generated by an inspection target; and
determining whether or not the inspection target is abnormal based on the calculated degree.

10. A non-transitory recording medium storing an abnormality determination program causing a computer to:
calculate a scatter degree of differences between prediction information on an observation target and observation information on the observation target, the prediction information being an information generated in accordance with a scenario that represents an aspect of state change of the observation target, the observation information generated by an inspection target; and
determine whether or not the inspection target is abnormal based on the degree calculated by the calculation function.

11. The non-transitory recording medium storing the abnormality determination program according to claim 10, the program causing a computer to further:
generate the prediction information, and
calculate the differences based on a probability density function and a difference between the prediction information and the observation information.

* * * * *